United States Patent
Puttaswamy Naga et al.

(10) Patent No.: US 9,043,588 B2
(45) Date of Patent: May 26, 2015

(54) METHOD AND APPARATUS FOR ACCELERATING CONNECTIONS IN A CLOUD NETWORK

(75) Inventors: Krishna P. Puttaswamy Naga, Edison, NJ (US); Katherine Guo, Scotch Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 252 days.

(21) Appl. No.: 13/466,251

(22) Filed: May 8, 2012

(65) Prior Publication Data

US 2013/0305037 A1   Nov. 14, 2013

(51) Int. Cl.
*H04L 29/08* (2006.01)
*H04L 29/06* (2006.01)
*G06F 17/30* (2006.01)

(52) U.S. Cl.
CPC ......... *H04L 63/0428* (2013.01); *H04L 2209/60* (2013.01); *G06F 17/3089* (2013.01); *H04L 67/2852* (2013.01)

(58) Field of Classification Search
CPC ... G06F 3/0641; G06F 17/30; G06F 17/3002; G06F 17/3025; G06F 17/30156; G06F 17/30159; G06F 17/30165; G06F 2209/509; G06F 17/3089; H03M 7/3091; H04L 63/0428; H04L 67/2852; H04L 2209/60
See application file for complete search history.

(56) References Cited

U.S. PATENT DOCUMENTS

| | | | | |
|---|---|---|---|---|
| 5,414,833 A | * | 5/1995 | Hershey et al. | 726/22 |
| 6,047,268 A | * | 4/2000 | Bartoli et al. | 705/35 |
| 7,502,972 B1 | * | 3/2009 | Chilukuri et al. | 714/45 |
| 7,818,585 B2 | * | 10/2010 | Kilian-Kehr et al. | 713/193 |
| 7,908,269 B2 | * | 3/2011 | Tiemann et al. | 707/726 |
| 8,401,188 B1 | * | 3/2013 | Swaminathan et al. | 380/217 |
| 8,621,036 B1 | * | 12/2013 | L'Heureux et al. | 709/217 |
| 8,812,874 B1 | * | 8/2014 | Clifford | 713/193 |
| 2002/0112158 A1 | * | 8/2002 | Golchikov | 713/164 |
| 2002/0184488 A1 | * | 12/2002 | Amini et al. | 713/153 |
| 2002/0188631 A1 | * | 12/2002 | Tiemann et al. | 707/513 |
| 2003/0055915 A1 | * | 3/2003 | Ngo | 709/219 |
| 2003/0061163 A1 | * | 3/2003 | Durfield | 705/44 |
| 2003/0140118 A1 | * | 7/2003 | Alexander Lloyd et al. | 709/218 |
| 2004/0153458 A1 | * | 8/2004 | Noble et al. | 707/10 |
| 2005/0097313 A1 | * | 5/2005 | Bolosky et al. | 713/150 |
| 2005/0108240 A1 | * | 5/2005 | Bolosky et al. | 707/9 |

(Continued)

FOREIGN PATENT DOCUMENTS

WO   WO 2011076463 A1 * 6/2011

OTHER PUBLICATIONS

Carpenter, B. "Middleboxes: Taxonomy and Issues", Network Working Group, RFC 3234, Feb. 2002.*

(Continued)

*Primary Examiner* — Andrew Nalven
*Assistant Examiner* — Walter Malinowski
(74) *Attorney, Agent, or Firm* — C Bilicska

(57) ABSTRACT

Various embodiments provide a method and apparatus of providing accelerated encrypted connections in a cloud network supporting transmission of data including per-user encrypted data. Transmission of encrypted data from an application server uses an encryption scheme that encrypts static data using a first encryption scheme that derives keys from the content itself and encrypts dynamic data, such as dynamic website content with personalized user data, using a second encryption scheme.

20 Claims, 5 Drawing Sheets

(56) References Cited

U.S. PATENT DOCUMENTS

| | | | |
|---|---|---|---|
| 2005/0169465 A1* | 8/2005 | Itani | 380/42 |
| 2006/0015945 A1* | 1/2006 | Fields | 726/27 |
| 2006/0026042 A1* | 2/2006 | Awaraji et al. | 705/3 |
| 2006/0259587 A1* | 11/2006 | Ackerman et al. | 709/219 |
| 2007/0033441 A1* | 2/2007 | Sathe et al. | 714/38 |
| 2007/0136817 A1* | 6/2007 | Nguyen | 726/26 |
| 2008/0052531 A1* | 2/2008 | Martinsson et al. | 713/189 |
| 2009/0063261 A1* | 3/2009 | Scribner et al. | 705/14 |
| 2009/0125677 A1* | 5/2009 | Leveque et al. | 711/113 |
| 2009/0254707 A1 | 10/2009 | Alstad | |
| 2010/0124332 A1* | 5/2010 | Arena | 380/270 |
| 2010/0211782 A1* | 8/2010 | Auradkar et al. | 713/168 |
| 2010/0228800 A1* | 9/2010 | Aston et al. | 707/822 |
| 2010/0262406 A1* | 10/2010 | Goel et al. | 703/2 |
| 2010/0299267 A1* | 11/2010 | Faith et al. | 705/76 |
| 2010/0312821 A1* | 12/2010 | Bannoura et al. | 709/203 |
| 2011/0019617 A1* | 1/2011 | Ho et al. | 370/328 |
| 2011/0126110 A1* | 5/2011 | Vilke et al. | 715/736 |
| 2011/0173455 A1* | 7/2011 | Spalka et al. | 713/189 |
| 2011/0176556 A1 | 7/2011 | Guo et al. | |
| 2011/0196988 A1* | 8/2011 | Bannoura et al. | 709/247 |
| 2011/0276656 A1* | 11/2011 | Knapp et al. | 709/219 |
| 2011/0282932 A1* | 11/2011 | Ramjee et al. | 709/203 |
| 2012/0089829 A1* | 4/2012 | Kholidy | 713/153 |
| 2012/0204024 A1* | 8/2012 | Augenstein et al. | 713/150 |
| 2012/0284195 A1* | 11/2012 | McMillen et al. | 705/71 |
| 2013/0163606 A1* | 6/2013 | Bagepalli et al. | 370/409 |
| 2013/0275618 A1* | 10/2013 | Puttaswamy Naga et al. | 709/236 |

OTHER PUBLICATIONS

Park, "Supporting Practical Content-Addressable Caching with CZIP Compression", ATC'07 2007 USENIX Annual Technical Conference on Proceedings of the USENIX Annual Technical Conference, Article No. 14, 2007, 14 pages.*

Kholidy, "A New Accelerated RC4 Scheme using "Ultra Gridsec" and "HIMAN" and use this Scheme to secure "HIMAN" Data", 2009 Fifth International Conference on Information Assurance and Security, IEEE Computer Society, 2009, pp. 617-622.*

Yong Song, et al: "Multiple-Channel Security Architecture and its Implementation over SSL", Eurasip Journal on Wireless Communications and Networking, vol. 2006, Jan. 1, 2006, pp. 1-14.

PCT International Search Report dated Jun. 25, 2013 (PCT/US2013/034212) 4 Pages.

* cited by examiner

US 9,043,588 B2

METHOD AND APPARATUS FOR ACCELERATING CONNECTIONS IN A CLOUD NETWORK

TECHNICAL FIELD

The invention relates generally to methods and apparatus for providing accelerated connections in a cloud network.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known accelerated connection systems, a WAN acceleration middle box remembers previously received data, and through data de-duplication, replaces repeated byte sequences of newly received data with an identifier to reduce application latency and conserve bandwidth.

In some known application servers, encrypted data is served from cloud servers to clients. In some of these known systems, encrypted connections use different keys for different users (i.e., per-user encryption) leading to different cyphertext for the same transmitted data.

SUMMARY

Various embodiments provide a method and apparatus of providing accelerated encrypted connections in a cloud network supporting transmission of data including per-user encrypted data. Transmission of encrypted data from an application server uses an encryption scheme that encrypts static data using a first encryption scheme that derives keys from the content itself and encrypts dynamic data, such as dynamic website content with personalized user data, using a second encryption scheme. Advantageously, this encryption scheme allows conventional acceleration middle boxes to de-duplicate the encrypted static data.

In one embodiment, an apparatus is provided for providing encryption of a target file in an acceleration connection system. The apparatus includes a data storage and a processor communicatively connected to the data storage. The processor is programmed to: separate the target file into at least one first static file chunk and at least one first dynamic file chunk in response to a request from a first client, separate the target file into at least one second static file chunk and at least one second dynamic file chunk in response to a request from a second client, create a first encrypted static file chunk of the at least one first static file chunk based on a first encryption scheme, create a first encrypted dynamic file chunk of the at least one first dynamic file chunk based on a second encryption scheme, create a second encrypted static file chunk of the at least one second static file chunk based on a first encryption scheme, and create a second encrypted dynamic file chunk of the at least one second dynamic file chunk based on a second encryption scheme. In the apparatus, the first client and the second client are different, the first encryption scheme and the second encryption scheme are different, and the first encrypted static file chunk and the second encrypted static file chunk are the same.

In some of the above embodiments, the first encryption scheme is convergent encryption.

In some of the above embodiments, the second encryption scheme is symmetric key encryption.

In some of the above embodiments, the creation of the encrypted static file chunk includes further programming the processor to encrypt a first static encryption key using a third encryption scheme, the first static encryption key being the decryption key for the first encrypted static file chunk.

In some of the above embodiments, the second encryption scheme is the same as the third encryption scheme.

In some of the above embodiments, the separation of the target file into the at least one first static file chunk includes programming the processor to determine that the at least one first static file chunk comprises data common to a plurality of clients.

In some of the above embodiments, the separation of the target file into the at least one first dynamic file chunk includes programming the processor to: determine that the at least one first dynamic file chunk includes personal data, HTML form information, or transient data.

In some of the above embodiments, the processor is further programmed to create a message, the message indicating that the first static file chunk is static data.

In some of the above embodiments, creation of the first encrypted static file chunk and the creation of the first encrypted dynamic file chunk is done at the application layer.

In a second embodiment, a system is provided for serving a target file in an acceleration connection system. The system includes a plurality of clients, including a first client and a second client, at least one acceleration middle box connected to at least the first client and the second client, and an application server connected to the acceleration middle box and to at least the first client and the second client. The application server is programmed to: separate the target file into at least one first static file chunk and at least one first dynamic file chunk in response to a request from a first client, separate the target file into at least one second static file chunk and at least one second dynamic file chunk in response to a request from a second client, create a first encrypted static file chunk of the at least one first static file chunk based on a first encryption scheme, create a first encrypted dynamic file chunk of the at least one first dynamic file chunk based on a second encryption scheme, create a second encrypted static file chunk of the at least one second static file chunk based on a first encryption scheme, create a second encrypted dynamic file chunk of the at least one second dynamic file chunk based on a second encryption scheme, transmit the first encrypted static file chunk and the first encrypted dynamic file chunk to the first client via the acceleration middle box, and transmit the second encrypted static file chunk and the second encrypted dynamic file chunk to the second client via the acceleration middle box. The acceleration middle box is programmed to: apply an acceleration scheme to the first encrypted static file chunk and to the second encrypted static file chunk. The first client is programmed to: retrieve the target file based on the first encrypted static file chunk and the first encrypted dynamic file chunk. The second client is programmed to: retrieve the target file based on the second encrypted static file chunk and the second encrypted dynamic file chunk. In the system, the first client and the second client are different, the first encryption scheme and the second encryption scheme are different, and the first encrypted static file chunk and the second encrypted static file chunk are the same.

In some of the above embodiments, the application server is further programmed to: encrypt a message using the second encryption scheme, the message indicating that the first static file chunk is static data, and transmit the message to the acceleration middle box. In the system, the acceleration middle box applies the acceleration scheme based on the message.

In a third embodiment, a method is provided for providing encryption of a target file in an acceleration connection system. The method includes: separating the target file into at least one first static file chunk and at least one first dynamic file chunk in response to a request from a first client, separating the target file into at least one second static file chunk and at least one second dynamic file chunk in response to a request from a second client, creating a first encrypted static file chunk of the at least one first static file chunk based on a first encryption scheme, creating a first encrypted dynamic file chunk of the at least one first dynamic file chunk based on a second encryption scheme, creating a second encrypted static file chunk of the at least one second static file chunk based on a first encryption scheme, and creating a second encrypted dynamic file chunk of the at least one second dynamic file chunk based on a second encryption scheme. In the method, the first client and the second client are different, the first encryption scheme and the second encryption scheme are different, and the first encrypted static file chunk and the second encrypted static file chunk are the same.

In some of the above embodiments, the method further includes: transmitting the first encrypted static file chunk to the first client, transmitting the first encrypted dynamic file chunk to the first client, transmitting the second encrypted static file chunk and the second encrypted dynamic file chunk to the second client, and transmitting the second encrypted static file chunk and the second encrypted dynamic file chunk to the second client.

In some of the above embodiments, the first encryption scheme is convergent encryption.

In some of the above embodiments, the second encryption scheme is symmetric key encryption.

In some of the above embodiments, the creation of the encrypted static file chunk includes: encrypting a first static encryption key using a third encryption scheme. The first static encryption key being the decryption key for the first encrypted static file chunk.

In some of the above embodiments, the method further includes: creating a message, the message indicating that the first static file chunk is static data, and transmitting the message to an acceleration middle box.

In some of the above embodiments, a packet including the first encrypted dynamic file chunk includes the message.

In some of the above embodiments, the step of transmitting the first encrypted dynamic file chunk uses HTTPS.

In some of the above embodiments, the steps of creating the first encrypted static file chunk and creating the first encrypted dynamic file chunk are done at the application layer.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus of providing accelerated encrypted connections in a cloud network supporting transmission of files including per-user encrypted data. Transmission of encrypted files from an application server uses an encryption scheme that encrypts static data using a first encryption scheme that derives keys from the content itself and encrypts dynamic data, such as dynamic website content with personalized user data, using a second encryption scheme.

Figure 1:
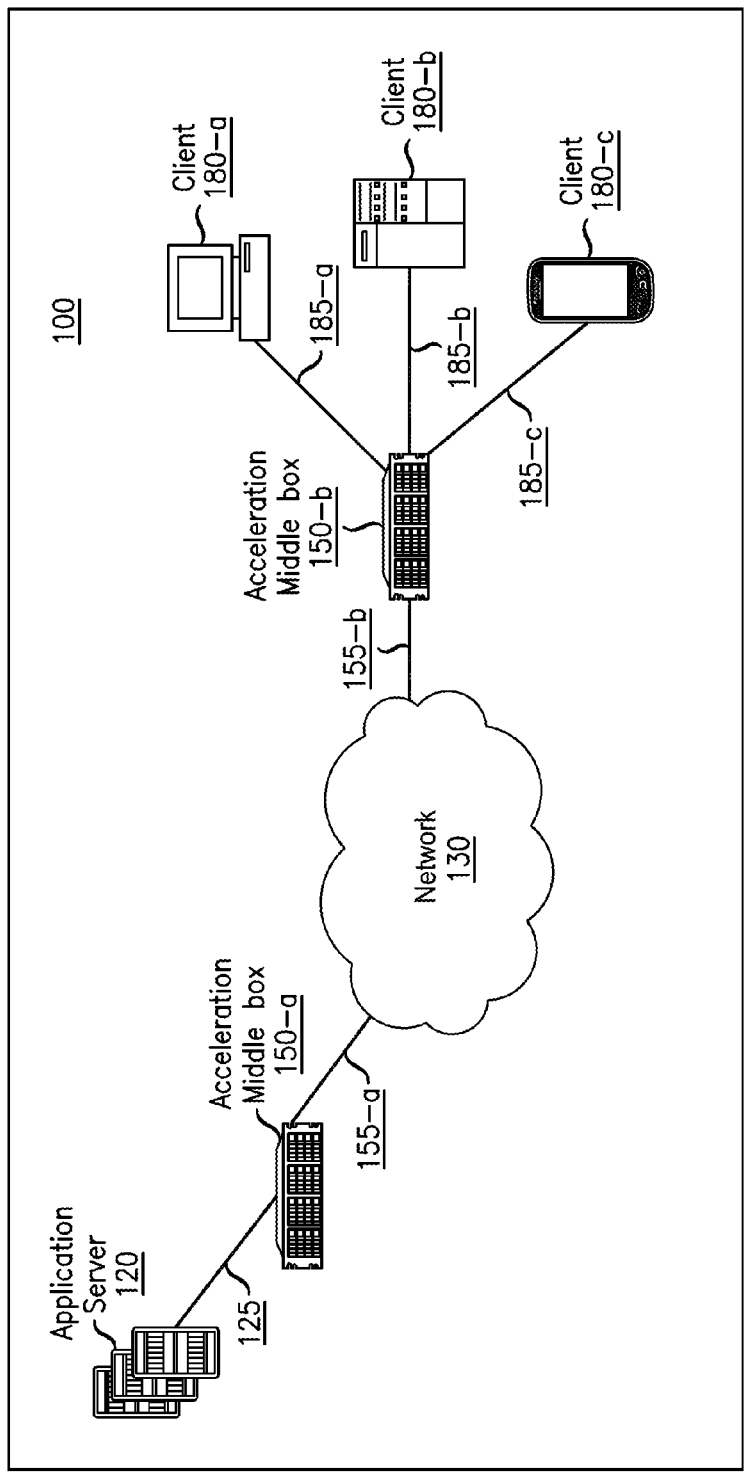
FIG. 1 illustrates a cloud network that includes an embodiment of the acceleration connection system 100 in a cloud network.

FIG. 1 illustrates a cloud network that includes an embodiment of the acceleration connection system 100 in a cloud network. The acceleration connection system 100 includes an application server 120 serving data to one or more clients 180-a-180-c (collectively, clients 180) over a communication path. The communication path includes an application communication channel 125, acceleration middle boxes 150-a and 150-b (collectively, acceleration middle boxes 150), acceleration middle box communication channels 155-a and 155-b (collectively, acceleration middle box communication channels 155), network 130, and one of client communication channels 185-a-185-c (collectively, client communication channels 185).

Application server 120 may be any apparatus capable of transmitting files to one or more clients 180 over application server communication channel 125. In particular, the application server transmits encrypted files using an encryption scheme that encrypts static file chunks, such as data common to a plurality of clients, using a first encryption scheme and encrypts dynamic file chunks, such as dynamic website content with personalized user data, using a second encryption scheme.

The terms "file" and "file chunk" as used herein means any application content and should be understood broadly as including any content capable of being transmitted or received over application server communication channel 125.

For example, files and file chunks may include: conventional files, packets, a stream of packets, a digital document, video or image content, file blocks, data objects, any portion of the aforementioned, or the like.

The communication channels 125, 155 and 185 support communicating over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125, 155 and 185 may be any number or combinations of communication channels.

Acceleration middle boxes 150 may be any apparatus capable of de-duplication of the static file chunks. In particular, the acceleration middle box caches the encrypted static file chunks from the application server and if a different client requests the same static file chunk, serves the static file chunk without requiring the entire static file chunk to traverse network 130. It should be appreciated that while two acceleration middle boxes are illustrated here, system 100 may include more acceleration middle boxes.

The network 130 includes any number of edge nodes and network devices and any number and configuration of links. Moreover, it should be appreciated that network 130 may include any combination and any number of wireless, wire line or femtocell networks including: LTE, GSM, CDMA, Local Area Network(s) (LAN), Wireless Local Area Network (s) (WLAN), Wide Area Network (WAN), Metropolitan Area Network (MAN), or the like.

Clients 180 may include any type of communication device (s) capable of sending or receiving files/file chunks over one or more of client communication channels 185. For example, a communication device may be a thin client, a smart phone (e.g., client 180-c), a personal or laptop computer (e.g., client 180-a), server (e.g., 180-b), network device, tablet, television set-top box, media player or the like. Communication devices may rely on other resources within exemplary system to perform a portion of tasks, such as processing or storage, or may be capable of independently performing tasks. It should be appreciated that while three clients are illustrated here, system 100 may include fewer of more clients. Moreover, the number of clients at any one time may be dynamic as clients may added or subtracted from the system at various times during operation.

In some embodiments, acceleration middle boxes 150 may be conventional WAN acceleration middle boxes.

Even though acceleration middle boxes 150 are depicted outside of network 130 for purposes of clarity, in some embodiments, acceleration middle boxes 150 may be within network 130.

In some embodiments, acceleration middle boxes 150 differentiate between the static file chunks and the dynamic file chunks received from application server 120.

In some embodiments, the application server 120 communicates to acceleration middle box 150-a, acceleration middle box 150-b or one or more of clients 180 via a protocol. The application server may communicate any suitable message between the application server and the acceleration middle boxes or clients such as whether the transmitted file chunk is static or dynamic, specifying how to apply an acceleration scheme or specifying how to apply a compression scheme. In some embodiments of this protocol, the application server transmits data in the form of packets and includes the message within a packet. In some of these embodiments, the message may specify whether the receiving acceleration middle box or client should process a file chunk as static or dynamic. In some of these embodiments, the application server and client pair may use a conventional end-host compression scheme. In this embodiment, the client may base implementation of the end-host compression scheme based on the message. For example, a client may compress dynamic file chunks using end-host compression, and transmit static file chunks uncompressed since the static file chunks will be accelerated by the acceleration middle boxes. In some of these embodiments, the message may be a part of the same information unit (e.g., packet) as the encrypted file chunk. In some of these embodiments, the message chunk may be in a different information unit (e.g., packet) than the encrypted file chunk. For example, a leading or trailing packet may contain a message indicating that a one or more following or proceeding packets contain static or dynamic file chunks.

In some embodiments, the acceleration middle boxes 150 pass dynamic file chunks without any processing.

Figure 2:
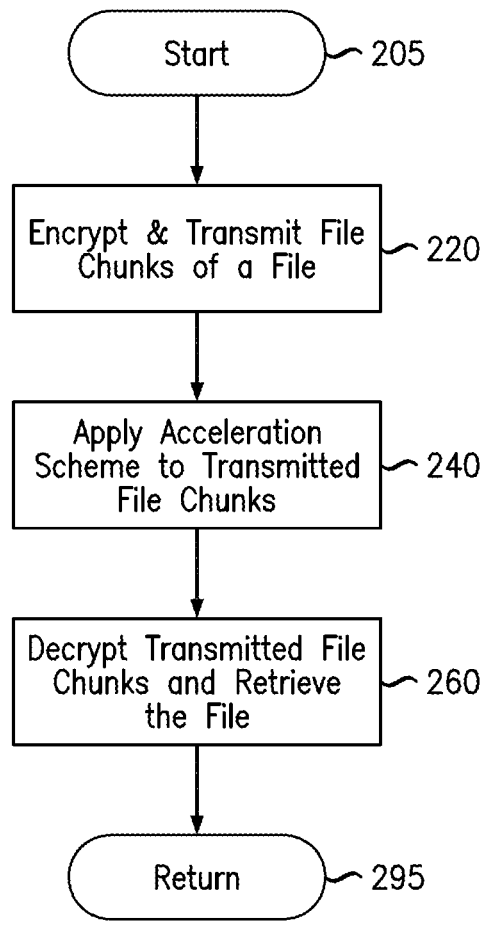
FIG. 2 depicts a flow chart illustrating an embodiment of a method 200 for the acceleration connection system 100 of FIG. 1 to provide transmission of a file including per-user encrypted data.

FIG. 2 depicts a flow chart illustrating an embodiment of a method 200 for the acceleration connection system 100 of FIG. 1 to provide transmission of a file including per-user encrypted data. The method includes an application server encrypting and transmitting file chunks of the file (step 220), acceleration middle boxes applying an acceleration scheme to the transmitted file chunks (step 240), and a client receiving and decrypting the transmitted file chunks (step 260).

In the method 200, the step 220 includes an application server (e.g., application server 120 of FIG. 1) encrypting and transmitting file chunks of a target file. In particular, the application server receives a request for a target file from a client (e.g., one of clients 180 of FIG. 1) and separates the target file into one or more static file chunks and one or more dynamic file chunks and transmits the separated file chunks to the requesting client via an acceleration middle box (e.g., acceleration middle box 150-a of FIG. 1).

In the method 200, the step 240 includes acceleration middle boxes (e.g., acceleration middle boxes 150-a and 150-b of FIG. 1) applying an acceleration scheme to the transmitted encrypted file chunks. An acceleration scheme replaces received encrypted static file chunks with corresponding identifiers. It should be appreciated that by replacing repeated byte sequences (e.g., static file chunks) with identifiers in subsequent transmissions, application latency or bandwidth may be reduced.

In the method 200, the step 260 includes a client (e.g., one of clients 180) receiving and decrypting the transmitted encrypted file chunks. In particular, the receiving client decrypts the appropriate received encrypted static file chunks and encrypted dynamic file chunks with the appropriate keys and rebuilds the target file.

Advantageously, conventional network elements in the network can remove the redundancy in encrypted traffic on the encrypted static file chunks without requiring changes in the network. Furthermore, dynamic file chunks (e.g., personal data) are not required to be stored by these network elements. For example, for two client requests for the same file (e.g., a web page), only the dynamic file chunks are required to be transmitted over the network (e.g., network 130 of FIG. 1), while the static file chunks may be transmitted to the client from an acceleration middle box proximate to the client (e.g., acceleration middle box 150-b of FIG. 1). Moreover, security (e.g., encryption) may be applied to both the static and dynamic file chunks.

Figure 3:
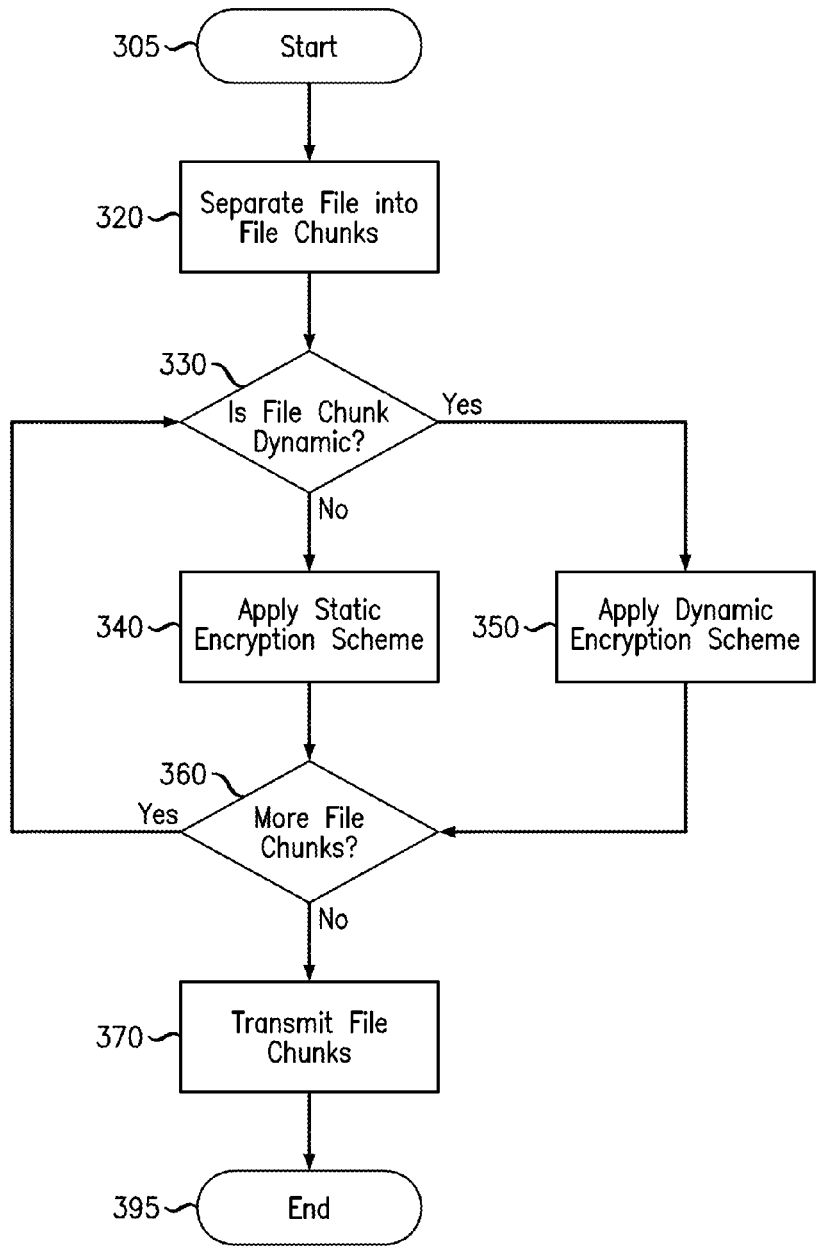
FIG. 3 depicts a flow chart illustrating an embodiment of a method 300 for an application server to encrypt data as illustrated in step 220 of FIG. 2.

FIG. 3 depicts a flow chart illustrating an embodiment of a method 300 for an application server (e.g., application server 120 of FIG. 1) to encrypt and transmit a target file as illustrated in step 220 of FIG. 2. The method includes separating the target file into file chunks (step 320) and for appropriate separated file chunks (step 360), applying a static encryption scheme (step 340) or a dynamic encryption scheme (step 350) based on whether the file chunk is dynamic (step 330). Finally, the method transmits the file chunks to the target client (e.g., one of clients 180 of FIG. 1) (step 370).

In the method 300, the step 320 includes separating a target file into chunks. In particular, the apparatus performing the method receives a request for a target file from a client (e.g., one of clients 180 of FIG. 1) and separates the target file into one or more static file chunks (i.e., static data) and one or more dynamic file chunks (i.e., dynamic data). Static file chunks may include data common to a number of users and not transient. Dynamic file chunks may include data that differs per user or is transient. Using an exemplary web page as an example, static file chunks may include: (i) images; (ii) common html such as found in metadata files; templates, headers, footers and menus; (iii) style sheet files such as css files; (iv) scripting files such as javascript or java files; (v) or the like. Furthermore, dynamic file chunks may include: (i) personal data such as messages on a social networking site or purchases on an e-commerce site; (ii) HTML form information previously entered by a user such as account information, ordering information; (iii) customized sections of a web page such as results of a search; (iv) transient data such as a stock ticker; or (v) the like.

In the method 300, the step 330 includes determining whether one of the separated file chunks contains dynamic data. If the file chunk contains dynamic data, the method proceeds to step 350, else the method proceeds to step 340.

In the method 300, step 340 includes applying a static encryption scheme to the one of the separated static file chunks. In particular, the static encryption scheme creates an encrypted static file chunk that is identical for different clients.

In the method 300, step 350 includes applying a dynamic encryption scheme to the one of the separated file chunks. In particular, the dynamic encryption scheme creates an encrypted dynamic file chunk that may or may not be identical for different clients. In some embodiments, the dynamic encryption scheme is symmetric key encryption.

In the method 300, the step 360 includes determining whether there are additional file chunks. If the additional file chunks exist, the method proceeds to step 330, else the method proceeds to step 370.

The method 300 optionally includes step 370. Step 370 includes transmitting the encrypted static and dynamic file chunks to the target client.

In some embodiments, the step 320 includes separating file chunk(s) that are static and "common" to multiple clients (i.e., static data) from file chunk(s) that are dynamic or personal to individual clients (i.e., dynamic data).

In some embodiments of the step 320, the "personal" data in the file is separated into one or more dynamic file chunks. Personal data is sensitive and different for each user. Advantageously, personal data may be encrypted so as not to compromise security properties, and yet conventional WAN acceleration middle boxes may perform redundancy elimination on the static file chunks.

In some embodiments, steps 320 and 360 may share functionality. For example, step 320 may not separate the target file into a complete set of file chunks. In this embodiment, step 360 may separate the next file chunk from the target file.

In some embodiments of the step 330, a decision may be made that the separated file chunk does not need to be encrypted using one of the encryption schemes of step 340 or 350 and the method may then proceed to step 360 without applying either of step 340 or 350.

In some embodiments, the step 340 includes using convergent encryption (CE) to encrypt the static file chunk. Convergent encryption derives keys from the content itself (e.g., a static file chunk) and that derived key is used to encrypt the content (e.g., the static file chunk). For example, for a static file chunk b, static file chunk b may be encrypted with a key k=H(b). Advantageously, the same static file chunk (e.g., plain text of a web page) will be encrypted using the same key creating an identical encrypted static file chunk. As such, the identical encrypted static file chunk can then be accelerated using conventional WAN acceleration solutions.

In some embodiments of the step 340, the key(s) to decrypt the convergently encrypted static file chunk is sent via a separate encryption scheme. In some of these embodiments, the key(s) is sent via HTTPS to the client.

In some embodiments, the step 340 includes applying the encryption scheme at the application layer. Advantageously, in some of these embodiments, other network elements may treat the encrypted static file chunk as plaintext data and apply existing schemes on top of the encrypted static file chunk enabling the full benefits of conventional WAN acceleration solutions.

In some embodiments of the step 350, the symmetric key encryption is HTTPS. For example, HTTPS connections include encrypted dynamic file chunks encrypted with per-user symmetric keys generated by the HTTPS protocol.

In some embodiments of the method 300, the key(s) to decrypt the static file chunk(s) in step 340 is included within at least one of the encrypted dynamic file chunk(s) of step 350.

In some embodiments of method 300, steps 330 and 360 may be performed concurrently. For example, a tertiary decision may be made in step 360 to either proceed to step 340, 350 or 370.

In some embodiments, step 370 may occur after each encryption step (e.g., 340 or 350) and is not required to wait until all the file chunks have been analyzed via step 360.

In some embodiments, step 370 includes transmitting according using TCP/IP or HTTPS.

Figure 4:
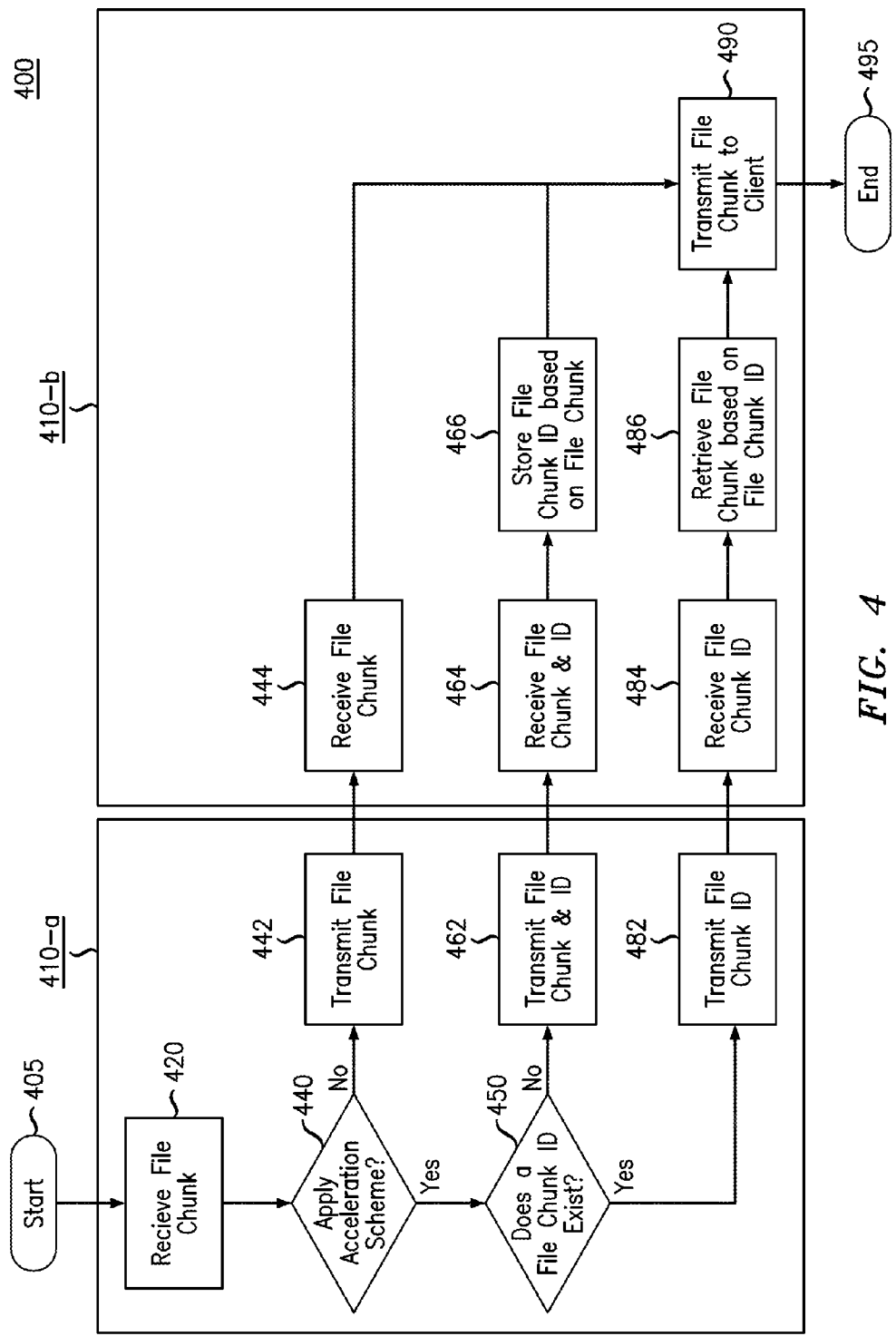
FIG. 4 depicts a flow chart illustrating an embodiment of a method 400 for a pair of acceleration middle boxes to provide an acceleration scheme as illustrated in step 240 of FIG. 2.

FIG. 4 depicts a flow chart illustrating an embodiment of a method 400 for a pair of acceleration middle boxes (e.g., acceleration middle boxes 150-*a* and 150-*b* of FIG. 1) to provide an acceleration scheme as illustrated in step 240 of FIG. 2. The method includes a portion 410-*a* performed by a first apparatus (e.g., acceleration middle box 150-*a* of FIG. 1) an a portion 410-*b* performed by a second apparatus (e.g., acceleration middle box 150-*b*).

The first apparatus receives a file chunk from an application server (e.g., application server 120 of FIG. 1) (step 420) and determines whether to apply an acceleration scheme to the file chunk (step 440). If the first apparatus determines that an acceleration scheme will not be applied, the first apparatus transmits the received file chunk to the second apparatus (step 442). If the first apparatus determines that an acceleration scheme will be applied, the first apparatus determines whether a file chunk identifier exists for the file chunk (step 450). If a file chunk identifier does not exist for the file chunk, the first apparatus determines the file chunk identifier and transmits the file chunk and its associated file chunk identifier to the second apparatus (step 462). If a file chunk identifier does exist for the file chunk, the first apparatus transmits the file chunk identifier to the second apparatus (step 482).

The second apparatus either: receives the file chunk (step 444), receives the file chunk and file chunk identifier (step 464) or receives the file chunk identifier (step 484) from the first apparatus and then transmits the file chunk to the client (step 490). If the second apparatus receives the file chunk and a file chunk identifier (step 464), the second apparatus stores the file chunk—file chunk identifier association (step 466) in addition to transmitting the file chunk. If the second apparatus receives only the file chunk identifier (step 484), the second apparatus retrieves the stored file chunk based on the file chunk—file chunk identifier association (step 486) in addition to transmitting the file chunk.

In some embodiments of the step 466 or 486, the file chunk—file chunk identifier may be associated in a table.

In some embodiments of the steps 462 and 464, the file chunk identifier is not transmitted with the file chunk. In these embodiments, if the second apparatus does not have a stored file chunk—file chunk identifier association, the second apparatus determines the file chunk identifier based on the file chunk and stores the determined file chunk identifier in step 466. It should be appreciated that if the file chunk identifier is based on the file chunk content, a file chunk identifier is not required to be transmitted by the first apparatus since the second apparatus can determine the file chunk identifier based on the contents of the file chunk.

In some embodiments of the step 482, the first apparatus may also transmit the file chunk. In some of these embodiments, the first apparatus may determine that a file chunk identifier has expired. In some of these embodiments, the first apparatus may determine that the second apparatus does not have the file chunk—file chunk identifier associated stored. For example, if the first apparatus is an acceleration middle box that has not yet received the file chunk—file chunk identifier previously or if the first apparatus receives an indication that the second apparatus no longer has the association stored. In some of these embodiments, the second apparatus may send a reply message to the first apparatus that the second apparatus does not have an association for a received file chunk identifier and then in response to the message, the first apparatus may send the file chunk and optionally resend the file chunk identifier.

Although primarily depicted and described in a particular sequence, it should be appreciated that the steps shown in methods 200, 300 and 400 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 5:
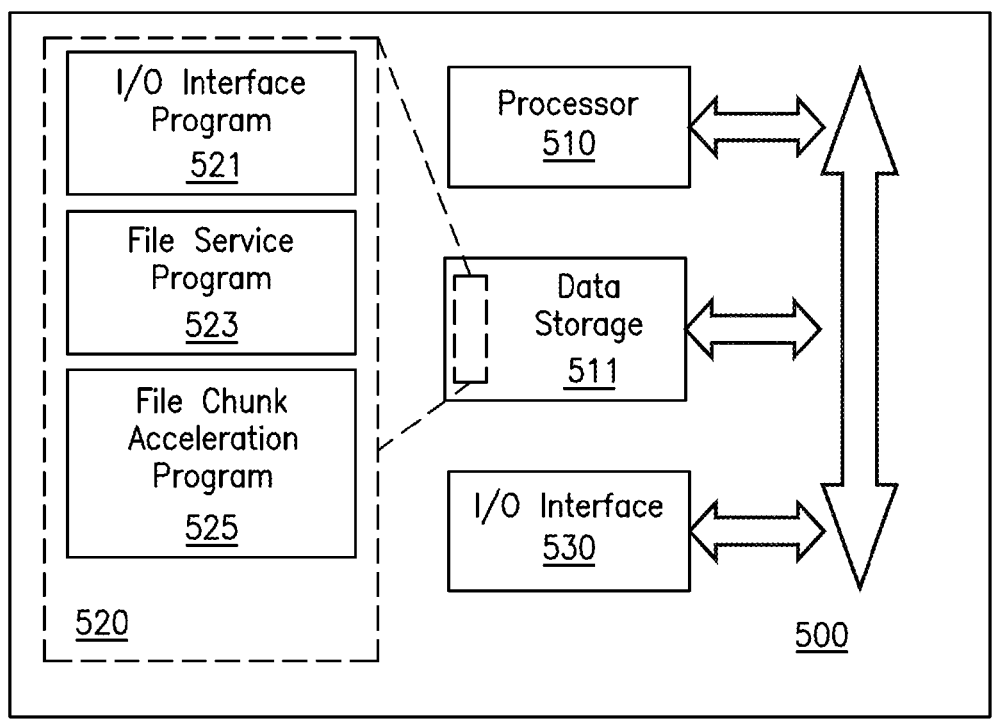
FIG. 5 schematically illustrates an embodiment of various apparatus 500 such as an application server 120 of FIG. 1 or one of the acceleration middle boxes 150 of FIG. 1.

FIG. 5 schematically illustrates an embodiment of various apparatus 500 such as an application server 120 of FIG. 1 or one of the acceleration middle boxes 150 of FIG. 1. The apparatus 500 includes a processor 510, a data storage 511, and an I/O interface 530.

The processor 510 controls the operation of the apparatus 500. The processor 510 cooperates with the data storage 511.

The data storage 511 may store program data such as routing information or the like as appropriate. The data storage 511 also stores programs 520 executable by the processor 510.

The processor-executable programs 520 may include an I/O interface program 521, a file servicing program 523, or a file chunk acceleration program 525. Processor 510 cooperates with processor-executable programs 520.

The I/O interface 530 cooperates with processor 510 and I/O interface program 521 to support communications over communications channels 125 and 155 of FIG. 1 as appropriate and as described above.

The file servicing program 523 performs the steps of method 300 of FIG. 3 as described above.

The file chunk acceleration program 525 performs the steps of portion 410-a or 410-b of method 400 of FIG. 4 as described above.

In some embodiments, the processor 510 may include resources such as processors/CPU cores, the I/O interface 530 may include any suitable network interfaces, or the data storage 511 may include memory or storage devices. Moreover the apparatus 500 may be any suitable physical hardware configuration such as: one or more server(s), blades consisting of components such as processor, memory, network interfaces or storage devices. In some of these embodiments, the apparatus 500 may include cloud network resources that are remote from each other.

In some embodiments, the apparatus 500 may be virtual machine. In some of these embodiments, the virtual machine may include components from different machines or be geographically dispersed. For example, the data storage 511 and the processor 510 may be in two different physical machines.

When processor-executable programs 520 are implemented on a processor 510, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing encryption of a target file in an acceleration connection system, the apparatus comprising:
   a data storage;
   an I/O interface; and
   a processor communicatively connected to the data storage and the I/O interface, the processor being configured to:
   communicatively connect to a first client, a second client and at least two acceleration middle boxes via the I/O interface;
   separate the target file into a first static file chunk and a first dynamic file chunk in response to a request from the first client;
   separate the target file into a second static file chunk and a second dynamic file chunk in response to a request from the second client, wherein the second static file chunk is the same as the first static file chunk;
   create a first encrypted static file chunk of the first static file chunk based on a first encryption scheme, the first encryption scheme deriving keys from the content of the first static file chunk;
   create a first encrypted dynamic file chunk of the first dynamic file chunk based on a second encryption scheme;
   create a second encrypted static file chunk of the second static file chunk based on the first encryption scheme;
   create a second encrypted dynamic file chunk of the second dynamic file chunk based on the second encryption scheme;
   transmit the first encrypted static file chunk and the first encrypted dynamic file chunk to the first client via the at least two acceleration middle boxes; and
   transmit the second encrypted static file chunk and the second encrypted dynamic file chunk to the second client via the at least two acceleration middle boxes;
   wherein the first client and the second client are different;
   wherein the first encryption scheme and the second encryption scheme are different;
   wherein the first encrypted static file chunk and the second encrypted static file chunk are the same;
   wherein the first encryption scheme is selected to allow the at least two acceleration middle boxes to de-duplicate the first and second encrypted static file chunk using an acceleration scheme; and
   wherein the first encryption scheme and second encryption scheme are selected to allow the first client to retrieve the target file based on the first encrypted static file chunk and the first encrypted dynamic file chunk and the second client to retrieve the target file based on the second encrypted static file chunk and the second encrypted dynamic file chunk.

2. The apparatus of claim 1, wherein the first encryption scheme is convergent encryption.

3. The apparatus of claim 2, wherein the second encryption scheme is symmetric key encryption.

4. The apparatus of claim 2, wherein the creation of the encrypted static file chunk comprises further configuring the processor to:
   encrypt a first static encryption key using a third encryption scheme, the first static encryption key being the decryption key for the first encrypted static file chunk.

5. The apparatus of claim 4, wherein the second encryption scheme is the same as the third encryption scheme.

6. The apparatus of claim 2, wherein the separation of the target file into the first static file chunk comprises configuring the processor to:
   determine that the first static file chunk comprises data common to a plurality of clients.

7. The apparatus of claim 2, wherein the separation of the target file into the first dynamic file chunk comprises configuring the processor to:
   determine that the first dynamic file chunk is selected from the group consisting of:
   personal data;
   HTML form information; and
   transient data.

8. The apparatus of claim 1, wherein the processor is further configured to:
   create a message, the message indicating that the first static file chunk is static data.

9. The apparatus of claim 1, wherein creation of the first encrypted static file chunk and the creation of the first encrypted dynamic file chunk is done at the application layer.

10. A system for serving a target file in an acceleration connection system, the system comprising:
   a plurality of clients, the plurality of clients including a first client and a second client;
   at least two acceleration middle boxes communicatively connected to at least the first client and the second client; and
   an application server comprising a storage, an I/O interface and a processor communicatively connected to the storage and I/O interface, the application server communicatively connected to the at least two acceleration middle boxes and to at least the first client and the second client via the I/O interface;
   the application server configured to:
   separate the target file into a first static file chunk and a first dynamic file chunk in response to a request from a first client;
   separate the target file into a second static file chunk and a second dynamic file chunk in response to a request from a second client, wherein the second static file chunk is the same as the first static file chunk;

create a first encrypted static file chunk of the first static file chunk based on a first encryption scheme, the first encryption scheme deriving keys from the content of the first static file chunk;

create a first encrypted dynamic file chunk of the first dynamic file chunk based on a second encryption scheme;

create a second encrypted static file chunk of the second static file chunk based on the first encryption scheme; and create a second encrypted dynamic file chunk of the second dynamic file chunk based on the second encryption scheme;

transmit the first encrypted static file chunk and the first encrypted dynamic file chunk to the first client via the acceleration middle box;

transmit the second encrypted static file chunk and the second encrypted dynamic file chunk to the second client via the acceleration middle box;

the acceleration middle boxes configured to:

apply an acceleration scheme to the first encrypted static file chunk and to the second encrypted static file chunk;

the first client configured to:

retrieve the target file based on the first encrypted static file chunk and the first encrypted dynamic file chunk; and the second client configured to:

retrieve the target file based on the second encrypted static file chunk and the second encrypted dynamic file chunk;

wherein the first client and the second client are different;

wherein the first encryption scheme and the second encryption scheme are different; and wherein the first encrypted static file chunk and the second encrypted static file chunk are the same.

11. The system of claim 10, wherein the application server is further configured to:

encrypt a message using the second encryption scheme, the message indicating that the first static file chunk is static data; and transmit the message to the acceleration middle box; and wherein the acceleration middle box applies the acceleration scheme based on the message.

12. A method for providing encryption of a target file in an acceleration connection system, the method comprising:

at a processor communicatively connected to a data storage and an I/O interface, separating the target file into a first static file chunk and a first dynamic file chunk in response to a request from a first client;

separating, by the processor in cooperation with the data storage, the target file into a second static file chunk and a second dynamic file chunk in response to a request from a second client, wherein the second static file chunk is the same as the first static file chunk;

creating, by the processor in cooperation with the data storage, a first encrypted static file chunk of the first static file chunk based on a first encryption scheme, the first encryption scheme deriving keys from the content of the first static file chunk;

creating, by the processor in cooperation with the data storage, a first encrypted dynamic file chunk of the first dynamic file chunk based on a second encryption scheme;

creating, by the processor in cooperation with the data storage, a second encrypted static file chunk of the second static file chunk based on the first encryption scheme;

creating, by the processor in cooperation with the data storage, a second encrypted dynamic file chunk of the second dynamic file chunk based on the second encryption scheme;

transmitting, by the processor in cooperation with the data storage and the I/O interface, the first encrypted static file chunk and the first encrypted dynamic file chunk to the first client via at least two acceleration middle boxes; and transmitting, by the processor in cooperation with the data storage and the I/O interface, the second encrypted static file chunk and the second encrypted dynamic file chunk to the second client via the at least two acceleration middle boxes;

wherein the first client and the second client are different;

wherein the first encryption scheme and the second encryption scheme are different;

wherein the first encrypted static file chunk and the second encrypted static file chunk are the same;

wherein the first encryption scheme is selected to allow the at least two acceleration middle boxes to de-duplicate the first and second encrypted static file chunk using an acceleration scheme; and wherein the first encryption scheme and second encryption scheme are selected to allow the first client to retrieve the target file based on the first encrypted static file chunk and the first encrypted dynamic file chunk and the second client to retrieve the target file based on the second encrypted static file chunk and the second encrypted dynamic file chunk.

13. The method of claim 12, further comprising:

transmitting, by the processor in cooperation with the data storage, the first encrypted static file chunk to the first client;

transmitting, by the processor in cooperation with the data storage, the first encrypted dynamic file chunk to the first client;

transmitting, by the processor in cooperation with the data storage, the second encrypted static file chunk and the second encrypted dynamic file chunk to the second client; and transmitting, by the processor in cooperation with the data storage, the second encrypted static file chunk and the second encrypted dynamic file chunk to the second client.

14. The method of claim 13, further comprising:

creating, by the processor in cooperation with the data storage, a message, the message indicating that the first static file chunk is static data; and transmitting, by the processor in cooperation with the data storage, the message to an acceleration middle box.

15. The method of claim 14, wherein a packet including the first encrypted dynamic file chunk includes the message.

16. The method of claim 13, wherein the step of transmitting the first encrypted dynamic file chunk uses HTTPS.

17. The method of claim 12, wherein the first encryption scheme is convergent encryption.

18. The method of claim 12, wherein the second encryption scheme is symmetric key encryption.

19. The method of claim 12, wherein the step of creating the first encrypted static file chunk comprises:

encrypting a first static encryption key using a third encryption scheme, the first static encryption key being the decryption key for the first encrypted static file chunk.

20. The apparatus of claim 12, wherein the steps of creating the first encrypted static file chunk and creating the first encrypted dynamic file chunk are done at the application layer.

* * * * *